(No Model.) 2 Sheets—Sheet 1.

D. CURRIE.
TAPER ATTACHMENT FOR LATHES.

No. 504,565. Patented Sept. 5, 1893.

Witnesses

Inventor
Daniel Currie
By his Attorney (No Model.) 2 Sheets—Sheet 2.

D. CURRIE.
TAPER ATTACHMENT FOR LATHES.

No. 504,565. Patented Sept. 5, 1893.

Witnesses

Inventor
Daniel Currie
By his Attorney

UNITED STATES PATENT OFFICE.

DANIEL CURRIE, OF MONTREAL, CANADA.

TAPER ATTACHMENT FOR LATHES.

SPECIFICATION forming part of Letters Patent No. 504,565, dated September 5, 1893.

Application filed June 1, 1892. Serial No. 435,213. (No model.)

*To all whom it may concern:*

Be it known that I, DANIEL CURRIE, of the city of Montreal, in the district of Montreal and Province of Quebec, Canada, have invented certain new and useful Improvements in Taper Attachments for Lathes; and I do hereby declare that the following is a full, clear, and exact description of the same.

This invention relates to the mechanism carried by a lathe for automatically regulating the movement of the tool when cutting or boring tapers or conical interiors and has for its object to provide mechanism of a direct and rotatory nature which can in no way subject any of the usual parts of the lathe to abnormal wear and will be easy of adjustment or variation to secure tapers of different degrees of obliquity or inclination.

Heretofore adjustable grooved bars arranged at one side of the lathe have been used, a slide connected with the tool rest, traveling in the groove of the bar and serving to move the tool in the oblique line required but this movement of the tool rest independently of the cross feed screw, and more or less against its action, is apt not only to cause excessive wearing of the screw and the guideways for the saddle carrying the tool rest, but also produces uneven work owing to a jerky action of the tool. Gear and rack connections have also been used for the same purpose with the result however that an uncertain action of the cross feed screw is obtained owing to the rotation of such screw being dependent upon the meshing of a pinion, which constitutes the initial rotative element, with a stationary rack. At present the usual direct bevel gear or other connection between the longitudinal and cross feed screws is only capable of giving automatically a reciprocal feed to the tool rest the speed of which is fixed or invariable except in so far as the rate may be changed by increasing or diminishing the speed of rotation of the longitudinal feed screw and I therefore propose to substitute for such bevel gear or other connection readily interchangeable and automatically operated direct rotatory mechanism which will allow of the motion transmitted from the longitudinal screw to the cross feed screw being varied independently of the former, but in a positive way. For full comprehension however of the invention, reference must be had to the annexed drawings forming a part of this specification in which like symbols indicate corresponding parts and wherein—

Figure 1:
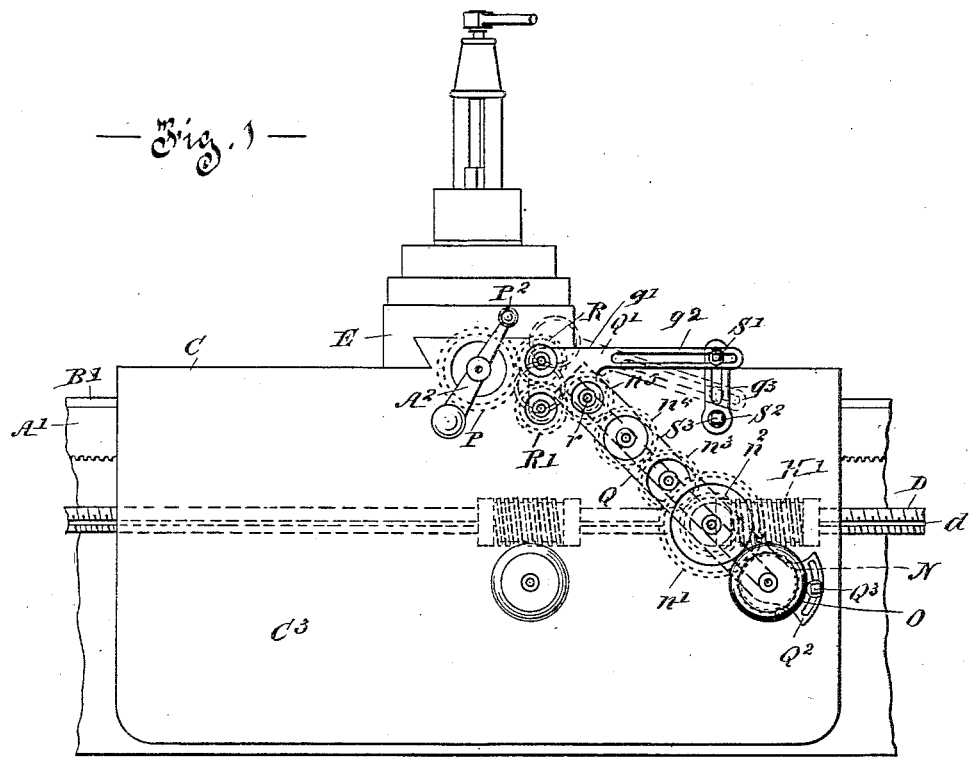
Figure 2:
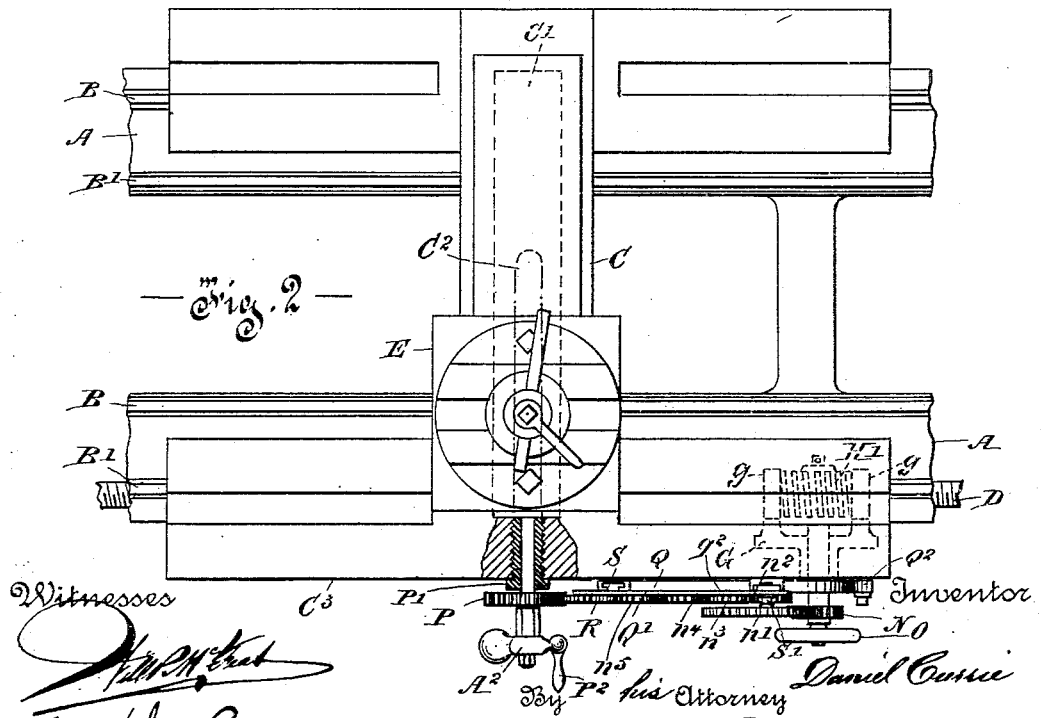
Figure 3:
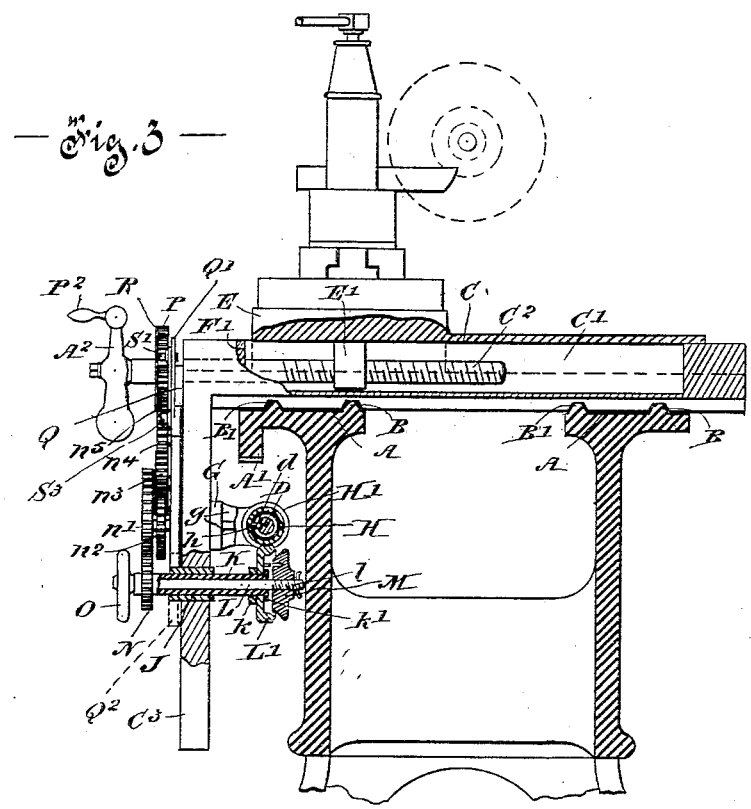

Figure 1 is a side elevation of the apron and top rest of a lathe with contiguous parts of the bed and longitudinal feed screw; Fig. 2 a plan view of the same parts as well as the saddle and guideways; Fig. 3 a part transverse section and elevation of the same parts, and Fig. 4 a diagram of an end of shafting showing different tapers indicated by dotted lines.

A is the bed of the lathe, A' the hand rack in same, $A^2$ the ordinary hand wheel connection with longitudinal feed screw, B B' the guideways for the saddle C and tail stock head, this latter not being shown.

C' is the trough in the saddle for accommodating the cross feed screw $C^2$, and $C^3$ is the apron depending from the front face of the saddle C, D being the longitudinal feed screw with key-way $d$ its full length.

E is the sliding base of the tool rest and E' the nut connecting it with the cross feed screw $C^2$ which is journaled in a bushing F' in the saddle and carries a gear wheel as will be hereinafter explained.

In place of the usual bevel gear or other connection between the screws $C^2$ and D, I use mechanism which may be described as follows: A bracket back piece G with two horizontal arms $g$ $g$ projecting therefrom and pierced to fit over the longitudinal feed screw D is secured to the back of the apron $C^3$ near one end thereof as shown, and a sleeve H, having a worm H' worked on its outside and a key $h$ on the inside to fit the keyway $d$, is located between the two arms $g$ $g$ so that when these arms and the worm sleeve are slipped over the screw D the sleeve will be obliged to travel with the apron and at the same time always rotate with the screw. At a point beneath this bracket piece G the apron is bored to receive a bushing J which forms a journal for a sleeve K in which is journaled a shaft or spindle L. This sleeve projects inward sufficiently to carry a worm gear L', which meshes with the worm H', is mounted loosely on such sleeve and held in place between two collars $k$ $k'$ on the end of the sleeve K. The end of the spindle L projects beyond the end of the sleeve and is screw threaded as shown at $l$ to receive a friction disk M loosely threaded upon it and adapted by the rotation of such spindle to be moved by the screw thread into or out of contact with the face of the worm gear L', suitably beveled to receive it, and the face of the collar $k'$ thus effecting a union between them and securing the rotation of the sleeve when desired. The outer end of the sleeve K carries a spur gear N which is secured in place to rotate with it but so as to be easily removed therefrom.

A hand wheel O is provided upon the outer end of the spindle L for operating same.

A set of gears $n'$ $n^2$ $n^3$ $n^4$ $n^5$ intermediate of the spur gear N and another gear P carried by the cross feed screw $C^2$ is carried by an adjustable carrier Q, each gear being mounted so as to be readily interchangeable and another adjustable carrier Q' serves to carry a couple of gears R R' through which reversal of motion can be secured. The carrier Q consists of a flat bar having a T-groove S to receive the heads of the studs on which the gears $n'$ $n^2$ $n^3$ $n^4$ $n^5$ are mounted such studs being slipped into place from the open end of the groove, and the opposite end of the bar is bored to fit over and turn on the bushing J projecting beyond the face of the apron, and has a grooved arc or segmental end piece $Q^2$ by which and a set screw $Q^3$ the carrier can be set at various angles to accommodate different sides of the gears. The carrier Q' consists of two sections one of which has a flat plate portion $q'$ pivoted at $r$ to the stud of the gear $n^5$ and carrying the reversing gears R R', and from this plate portion a link arm $q^2$ extends and is connected by a set screw S' with another link arm $q^3$ pivoted at $S^2$ by set screw $S^3$ to the apron C'. The motion of the cross feed screw can be reversed by throwing the gear R' into contact with the gear P on such screw by changing the position of the carrier Q' as shown by dotted lines in Fig. 1. The gear wheel P is keyed on the screw $C^2$ so as to be easily removed and a sleeve P' interposed between it and the usual handle $P^2$.

From the foregoing it will be seen that by loosening the set screws $Q^3$, S' $S^3$ the carriers Q Q' can be disconnected and any one or more of the series of gears $n'$ $n^2$ $n^3$ $n^4$ $n^5$ slipped out of the carrier Q a different one or number introduced and the carriers reset.

Figure 4:
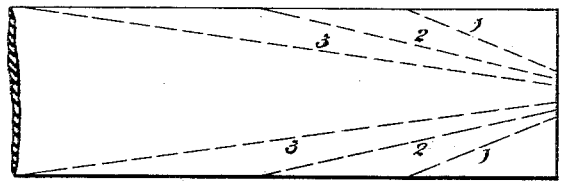

Fig. 4 gives a view of an end portion of shafting with tapers of different degrees of obliquity and length indicated by dotted lines the taper 1 1 being secured by increasing the speed of rotation of the cross feed screw relatively to that of the longitudinal feed screw, which is done by substituting a gear or gears having a smaller number of teeth, and that 3 3 by slowing the speed as by substituting a gear or gears having an increased quantity of teeth, the medium taper 2 2 depending upon a rate of speed between the first and third.

It is possible to gage the precise angle of obliquity of taper to the foot by the number of teeth on the gears interposed between the two feed screws.

An index may be arranged on the machine if desired showing the gears necesary to use in accomplishing the different degrees of taper.

What I claim is as follows:

1. In combination with the longitudinal and cross feed screws and apron of a lathe and a rotatory spindle and gear extension from said longitudinal feed screw at right angles thereto and passing through said apron,—of means, for effecting a variable direct and rotatory connection between said cross feed screw and spindle and gear extension, consisting of interchangeable gear wheels variable both as to number and size, a carrier for said gear wheels in the form of a bar, one end of which is pivotally connected with said lathe apron about the axis of said spindle and gear extension, and the other end is free to be moved in an arc in the vicinity of said cross feed screw, and constructed to allow of such interchangeability and variation; and connections between said gear wheels and the aforesaid cross feed screw and spindle and gear extension.

2. In combination with the longitudinal and cross feed screws and apron of a lathe; a taper attachment consisting of a grooved carrier pivotally connected with the lathe apron at one end and its opposite end free to be moved in an arc in the vicinity of said cross feed screw and carrying a series of interchangeable gear wheels between its pivoting point and such opposite free end, the positions of the axis or axes of one, two, or more, of which gear wheels may be varied relatively to each other and to said carrier; and direct rotatory connections between said gear wheels and the longitudinal and cross feed screws of the lathe.

3. In combination with the longitudinal and cross feed screws of a lathe; an adjustable grooved carrier pivotally connected with the lathe apron at one end and its opposite end free to be moved in an arc in the vicinity of said cross feed screw; one, or more interchangeable gear wheels having stud shafts set in the groove of said carrier between its pivoting point and said cross feed screw, and rotatory connections between said gear wheels and the longitudinal and cross feed screws of the lathe.

4. In combination with the longitudinal and cross feed screws and apron of a lathe; an adjustable grooved carrier pivotally connected with the lathe apron at one end and its opposite end free to be moved in an arc in the vicinity of said cross feed screw; one, or more, interchangeable gear wheels having stud shafts set in the groove of said carrier; a gear on the end of said cross feed screw intermeshing with said series; a worm-sleeve encircling said longitudinal feed screw, moving with said apron and having sliding rotatory connection with said longitudinal feed screw; and gear and spindle connections between said worm-sleeve and said interchangeable gear wheels.

5. In combination with the longitudinal and cross feed screws and apron of a lathe; an adjustable carrier consisting of a pivoted bar grooved to receive the stud mountings of a series of interchangeable gear wheels and provided with slotted segmental end piece by means of which and a set screw it is fixed at the desired angle; a second carrier, having a pivotal connection with said bar, being adjustable by pivoted link and set screw connections, and adapted to carry reversing gear wheels.

6. In combination with the longitudinal and cross feed screws and apron of a lathe; an adjustable carrier on the face of said apron, and means for setting same at various angles; one or more interchangeable gear wheels carried by said carrier; a gear wheel mounted on said cross feed screw in line with said interchangeable gear wheels; an adjustable carrier and two reversing gear wheels carried by it and interposed between the said interchangeable gear wheels and the gear wheel on the cross feed screw; a worm moving with said apron, and having sliding and rotatory connection with said longitudinal feed screw; a sleeve and spindle passing through the apron; a worm gear wheel mounted loosely on said sleeve and meshing with said worm; a gear set on said sleeve and meshing with said interchangeable gear wheels, and a friction device actuated by said spindle for effecting a union between said worm gear wheel and sleeve, as set forth.

DANIEL CURRIE.

Witnesses:
OWENN EVANS,
FRED. J. SEARS.